United States Patent
Oriakhi

(10) Patent No.: US 9,580,613 B2
(45) Date of Patent: Feb. 28, 2017

(54) WHITE INK

(71) Applicant: Fujifilm Imaging Colorants, Inc., New Castle, DE (US)

(72) Inventor: Christopher Oriakhi, New Castle, DE (US)

(73) Assignee: Fujifilm Imaging Colorants, Inc., New Castle, DE (US)

( * ) Notice: Subject to any disclaimer, the term of this patent is extended or adjusted under 35 U.S.C. 154(b) by 0 days.

(21) Appl. No.: 14/786,560

(22) PCT Filed: Mar. 25, 2014

(86) PCT No.: PCT/GB2014/050946
§ 371 (c)(1),
(2) Date: Oct. 23, 2015

(87) PCT Pub. No.: WO2014/174241
PCT Pub. Date: Oct. 30, 2014

(65) Prior Publication Data
US 2016/0083598 A1    Mar. 24, 2016

Related U.S. Application Data

(60) Provisional application No. 61/815,371, filed on Apr. 24, 2013.

(51) Int. Cl.
| | | |
|---|---|---|
| *C09D 11/322* | (2014.01) | |
| *C08K 5/3437* | (2006.01) | |
| *C08K 5/23* | (2006.01) | |
| *C09D 11/38* | (2014.01) | |
| *B32B 3/00* | (2006.01) | |

(52) U.S. Cl.
CPC .............. *C09D 11/322* (2013.01); *C08K 5/23* (2013.01); *C08K 5/3437* (2013.01); *C09D 11/38* (2013.01); *B32B 3/00* (2013.01)

(58) Field of Classification Search
CPC ..... C09D 11/322; C09D 11/326; C09D 11/38; C08K 5/3437; C08K 5/23; C08K 5/3417; B32B 3/00; B41M 7/0081; B41J 2/01; B41J 2/02
See application file for complete search history.

(56) References Cited

U.S. PATENT DOCUMENTS

| 814,286 A | 3/1906 | Harris |
|---|---|---|
| 4,365,035 A | 12/1982 | Zabiak |
| 7,850,774 B2 | 12/2010 | Oriakhi |
| 8,142,558 B2 | 3/2012 | Robertson et al. |
| 8,142,559 B2 | 3/2012 | Robertson et al. |
| 8,182,597 B2 | 5/2012 | Robertson et al. |
| 8,282,197 B2 | 10/2012 | De Voeght et al. |
| 8,287,112 B2 | 10/2012 | Van Thillo et al. |
| 8,398,199 B2 | 3/2013 | Verdonck |
| 8,414,695 B2 | 4/2013 | Robertson et al. |
| 8,480,203 B2 | 7/2013 | Van Thillo et al. |
| 8,529,049 B2 | 9/2013 | De Voeght et al. |
| 8,632,630 B2 | 1/2014 | Robertson et al. |
| 8,757,789 B2 | 6/2014 | Van Thillo et al. |
| 8,979,256 B2 | 3/2015 | Verdonck |
| 9,004,663 B2 | 4/2015 | Van Thillo et al. |
| 9,039,824 B2 | 5/2015 | Robertson et al. |
| 2003/0061965 A1* | 4/2003 | Taguchi ................. C09D 11/38 106/31.27 |
| 2007/0060670 A1* | 3/2007 | Ellis ..................... C09D 11/322 523/160 |
| 2008/0268156 A1* | 10/2008 | Ueno .................... D06P 1/6735 427/288 |
| 2014/0165874 A1 | 6/2014 | Robertson et al. |
| 2015/0035894 A1* | 2/2015 | Popat ................... C09D 11/322 347/20 |

FOREIGN PATENT DOCUMENTS

| WO | WO 2012/153119 A1 * | 11/2012 | ............. C09D 11/00 |
|---|---|---|---|
| WO | 2014/135843 A1 | 9/2014 | |

OTHER PUBLICATIONS

International Search Report issued from corresponding PCT/GB2014/050946, dated Jun. 20, 2014.

* cited by examiner

*Primary Examiner* — Betelhem Shewareged

(74) *Attorney, Agent, or Firm* — Banner & Witcoff, Ltd.

(57) ABSTRACT

An ink comprising: (a) from 1 to 25 parts of surface treated titanium dioxide; (b) from 8 to 25 parts of a first solvent selected from the group consisting of ethylene glycol, diethylene glycol, triethylene glycol and dipropylene glycol; (c) from 2 to 12 parts of a second solvent selected from the group consisting of 2-pyrrolidone, N-methyl-2-pyrrolidone, N-ethyl-2-pyrrolidone, N-cyclohexyl-2-pyrrolidone and N,N-dimethylacetamide; (d) from 15 to 45 parts of glycerol; (e) from 0.1 to 2 parts of an acetylenic surfactant; (f) from 0.001 to 2 parts of 1,2-benzisothiazolin-3-one; (g) from 0 to 20 parts of polymer particles; and (h) the balance to 100 parts water.

13 Claims, No Drawings

WHITE INK

RELATED APPLICATION DATA

This application is a National Stage Application under 35 U.S.C. 371 of co-pending PCT application number PCT/GB2014/050946 designating the United States and filed Mar. 25, 2014; which claims the benefit of U.S. provisional application No. 61/815,371 and filed Apr. 24, 2013 each of which are hereby incorporated by reference in their entireties.

This invention relates to white inks, a process for ink-jet printing, ink-jet ink containers and ink-jet printers.

White inks are used to provide good visibility when printed on transparent and coloured surfaces. White printing on these surfaces is desirable in numerous end uses, such as the computer industry (printed circuit boards, computer chips), recording industry (tapes, film, etc.), packaging and automotive coatings. White ink is used not only to detail and add decals to automobiles, but also to other motor vehicles, including trucks, planes and trains, as well as bicycles, etc. White ink can also be useful on other surfaces, such as plastics, wood, metal, glass, textiles, polymeric films and leather for both practical and ornamental purposes.

A preferred means of applying white ink is by ink-jet printing.

Ink-jet printing is a non-impact printing technique in which droplets of an ink are ejected through fine nozzles onto a substrate without bringing the nozzles into contact with the substrate. There are basically three types of ink-jet printing:

i) Continuous ink-jet printing uses a pressurized ink source that produces a continuous stream of ink droplets from a nozzle. The droplets of ink are directed either thermally or by electrostatic means at a nominally constant distance from the nozzle. Those droplets which are not successfully deflected are recycled to the ink reservoir via a gutter.

ii) Drop-on-demand ink-jet printing where the ink is stored in a cartridge and fired from the print-head nozzle using a pressurization actuator (usually thermal or piezoelectric). With drop-on-demand printing only the drops that are required for printing are produced.

iii) Re-circulating ink-jet printing where the ink is continuously re-circulated in the print-head and (as in drop-on demand printing) only drops required for printing are drawn off to the nozzle.

Each of these types of ink-jet printing presents unique challenges. Thus, in continuous ink-jet printing ink active solvent monitoring and regulation is required to counter solvent evaporation during the time of flight (time between nozzle ejection and gutter recycling), and from the venting process whereby excess air (drawn into the reservoir when recycling unused drops) is removed.

In drop-on demand printing the ink may be kept in the cartridge for long periods when it can deteriorate and form precipitates which can, in use, block the fine nozzles in the print-head. This problem is particularly acute with pigment inks where the suspended pigment can settle out.

Re-circulating ink-jet printing avoids these problems. Since the ink is constantly circulating it lessens the chance of precipitates forming and as the ink is only removed to the nozzle as required solvent evaporation is minimised.

It is particularly challenging to develop inks for these printers when they are use in industrial ink-jet printing. Industrial ink-jet printers are required to work at high speeds. Optimally a print-head for an industrial ink-jet printer will have multiple nozzles arranged at a high density to enabling single-pass printing.

In industrial ink-jet printing wetting of the face plate of print head can be a particular problem.

The wetting capability of a liquid is a function of its surface tension relative to the surface energy of the solid surface. Thus, if the molecules of the liquid have a stronger attraction to the molecules of the solid surface than to each other (the adhesive forces are stronger than the cohesive forces), wetting of the surface occurs. However, if the molecules in the liquid are more strongly attracted to each other than the molecules of the solid surface (the cohesive forces are stronger than the adhesive forces), the liquid beads-up and does not wet the surface. The degree of wetting of a liquid on a particular surface may be determined by measuring the contact angle of a drop of the liquid placed on the surface. A liquid is said to wet a surface when the contact angle is less than 90°. The lower the contact angle the greater the degree of wetting.

It is challenging to design an ink which does not wet the print-head face-plate. It is possible to treat the face-plate of the print-head so as to minimise wetting. However, it can be difficult to treat some types of print-head to leave a stable and durable hydrophobic coated non-wetting face plate.

There are particular problems associated with the use of white inks in ink-jet printing. For example, titanium dioxide is a common white ink pigment and is generally three to four times heavier than pigments for other colour inks. Thus, pigments such as titanium dioxide have a much greater tendency to agglomerate and sediment and so clog the nozzles of inkjet systems.

Therefore developing white inks containing titanium dioxide is particularly challenging.

According to a first aspect of the present invention there is provided an ink comprising:
(a) from 1 to 25 parts of surface treated titanium dioxide;
(b) from 8 to 25 parts of a first solvent selected from the group consisting of ethylene glycol, diethylene glycol, triethylene glycol and dipropylene glycol;
(c) from 2 to 12 parts of a second solvent selected from the group consisting of 2-pyrrolidone, N-methyl-2-pyrrolidone, N-ethyl-2-pyrrolidone, N-cyclohexyl-2-pyrrolidone and N,N-dimethylacetamide;
(d) from 15 to 45 parts of glycerol;
(e) from 0.1 to 2 parts of an acetylenic surfactant;
(f) from 0.001 to 2 parts of 1,2-benzisothiazolin-3-one;
(g) from 0 to 20 parts of polymer particles; and
(h) the balance to 100 parts water.

All parts and percentages herein (unless stated otherwise) are by weight.

In one preferred embodiment the ink is free of polymer particles

The titanium dioxide present in the surface treated titanium dioxide pigment may be in rutile or anatase form or a mixture of the two forms.

The titanium dioxide particles can have a wide variety of average particle sizes of about 1 micron or less, depending on the desired end use application of the ink.

The titanium dioxide pigment is in and of itself white in color.

For applications demanding high hiding or decorative printing applications, the titanium dioxide particles preferably have a Z average mean particle diameter of less than 1 micron (1000 nm). Preferably, the particles have a Z average mean particle diameter of from 50 to 950 nm, more preferably from 75 to 750 nm, and still more preferably from 100 to 500 nm. It is especially preferred that the titanium dioxide particles have a Z average mean particle diameter of from 200 to 300 nm. The Z average mean particle diameter may be readily measured using a Zetasizer from Malvern Instruments. Titanium dioxide particles of this size are commonly called pigmentary titanium dioxide.

The titanium dioxide is preferably incorporated into an ink formulation via a slurry concentrate composition. The amount of titanium dioxide present in the slurry composition is preferably from about 20 wt % to about 80 wt %, based on the total slurry weight.

The titanium dioxide pigment may be substantially pure titanium dioxide or may comprise other metal oxides. These other metal oxides are preferably one or more selected from the group consisting of silica, alumina, zirconia and mixtures thereof. Other metal oxides may become incorporated into the pigment particles, for example, by co-oxidizing or co-precipitating titanium compounds with other metal compounds. If the titanium dioxide pigment comprises co-oxidized or co-precipitated metals, they are preferably present as the metal oxide in an amount from 0.1 wt % to 20 wt %, more preferably from 0.5 wt % to 5 wt %, and still more preferably from 0.5 wt % to 1.5 wt %, based on the total titanium dioxide pigment weight.

In a preferred embodiment the surface of the surface treated titanium dioxide is coated with an inorganic compound selected from the group consisting of silica, alumina, alumina-silica or zirconia. Such coatings may be present in an amount of from 0.1 wt % to 10 wt %, and preferably from 0.5 wt % to 3 wt %, based on the total weight of the titanium dioxide.

The surface of the surface treated titanium dioxide may also carry one or more organic surface coatings. The organic surface coatings are, for example, selected from the group consisting of carboxylic acids, silanes, siloxanes and hydrocarbon waxes, and their reaction products. The amount of organic surface coating generally ranges from 0.01 wt % to 6 wt %, preferably from 0.1 wt % to 3 wt % and more preferably from 0.5 wt % to 1.5 wt % based on the total weight of the titanium dioxide.

In one preferred embodiment the surface treated titanium dioxide is treated so it has a hydrophilic character.

In a preferred embodiment in the surface of the surface treated titanium dioxide in component (a) is treated with alumina, silica, silicone or mixtures thereof.

The surface treated titanium dioxide in component (a) is preferably present in the range of from 3 to 20 parts, more preferably in the range of from 8 to 16 parts and especially in the range of from 10 to 14 parts.

Mixtures of titanium dioxide with different surface treatments may also be used.

The first solvent, component (b), is preferably either diethylene glycol or triethylene glycol in one preferred embodiment the first solvent is diethylene glycol and in a second preferred embodiment the first solvent is triethylene glycol.

The first solvent is preferably present in the range of from 8 to 16 parts and more preferably in the range of from 10 to 14 parts.

Component (c), the second solvent, is preferably 2-pyrrolidone or N-methyl-2-pyrrolidone more preferably the second solvent is 2-pyrrolidone.

Preferably component (c) is present in the range of from 3 to 10 parts.

Component (d) glycerol is preferably present in the range of from 15 to 40 parts and is more preferably present in the range of from 20 to 40 parts.

One of the roles of glycerol is to help control the viscosity of the ink. The first solvent (component (b)) is also important in viscosity control. Thus, the levels of these two components are interrelated.

The acetylenic surfactant used as component (e) is preferably an ethylene oxide condensate of 2,4,7,9-tetramethyl-5-decyne-4,7-diol or 2,5,8,11-tetramethyl-6-dodecyne-5,8-diol. Surfactants such as this are available, for example, as Surfynol® and Dynol® surfactants from Air Products.

Component (e) is preferably present in the composition in an amount of from 0.1 to 1.2 parts and particularly from 0.2 to 0.8 parts and more particularly of from 0.2 to 0.7 parts.

Component (f) 1,2-benzisothazolin-3-one, is a broad spectrum alkali stable antimicrobial which does not release formaldehyde. It is available as a 20% active solution from Lonza as Proxel® GXL.

Component (f) is preferably present in the composition in an amount of from 0.001 to 0.1.

The ink may optionally comprise polymer particles (component (g)). Any kind of polymer (or copolymeric) particles may be used without limitation. The polymer in the polymer particles may be a polystyrenic, poly(meth)acrylic, poly-co-styreneic-(meth)acrylic, polyester, polyether, polyurethane, polycarbonate or polyamide polymer including grafts and physical blends thereof. The polymer may also be a natural polymer such as a cellulosic, protein or wax.

Preferably, the polymer particles have an average particle diameter of no more than 1 micron, more preferably from 10 to 500 nm, and especially from 100 to 200 nm and most especially from 30 to 150 nm. The preferred method for establishing the particle size of the polymer particles is by photon correlation spectroscopy.

When present the polymer particles may be used to assist in binding of the surface treated titanium dioxide to the substrate or to improve the gloss of the final print. Polymer particles tend to have little influence on the ink rheology at typical dilutions.

Particularly preferred polymer particles are those prepared by polymerising ethylenically unsaturated monomers (especially acrylates, methacrylates, styrenics etc). Other useful polymer particles include polyesters and polyurethanes. The polymer particles tend to have a solubility of less than 5%, more preferably less than 1% by weight by weight in water.

We have found that the presence of larger amounts of polymer particles can be detrimental to ink jet operability and latency. Thus, it is preferred that the amount of polymer particles in the ink is no more than 15, more preferably no more than 12, especially no more than 10 parts, more especially no more than 5 parts by weight. In some cases the amount of polymer particles in the ink is from 0.1 to 15, more preferably from 1 to 12 parts and especially from 3 to 10 parts by weight. We have found that these amounts of polymer particles tend to improve the adhesion and wetfastness properties of the final ink printed on a substrate.

In some cases it is preferred that polymer particles are absent from the ink.

Polymer particles can be made by many possible methods including solution dispersion, melt dispersion, suspension and especially emulsion polymerisation methods.

The polymer particles can be colloidally stabilised by an adsorbed surfactant and/or by water-dispersing groups which are part of the polymer particle structure.

Preferably the ink has a viscosity in the range of from 2 to 9 mPa·s and more preferably from 4 to 7 mPa·s when measured at 32° C. using a Brookfield spindle S00 at 3 rpm.

The ink preferably has a surface tension in the range of from 15 to 50 dynes/cm and more preferably in the range of from 25 to 45 dynes/cm, when measured at 25° C. using a Kruss K-11 Tensiometer (Wilhelmy Plate Method)

Preferably, the ink composition has been filtered through a filter having a mean pore size of less than 10 microns, more preferably less than 5 microns and especially less than 1 micron.

Preferably the ink has a pH in the range of from 7 to 9. The pH may be adjusted by means of a suitable buffer.

In addition to the above mentioned components, the ink composition may optionally comprise one or more ink additives. Preferred additives suitable for ink-jet printing inks are anti-kogation agents, rheology modifiers, corrosion inhibitors and chelating agents. Preferably, the total amount of all such additives is no more than 10 parts by weight. These additives are added to and comprise part of component (g), the water added to the ink.

In one preferred embodiment the ink comprises:
(a)i from 10 to 14 parts of surface treated titanium dioxide;
(b)i from 8 to 16 parts of diethylene glycol;
(c)i from 3 to 7 parts of 2-pyrrolidone;
(d)i from 20 to 40 parts of glycerol;
(e)i from 0.1 to 1.2 parts of an ethylene oxide condensate of 2,4,7,9 tetramethyl-5-decyne-4,7-diol;
(f)i from 0.001 to 0.1 parts of 1,2-benzisothiazolin-3-one;
(g)i the balance to 100 parts water.

In a second preferred embodiment the ink comprises:
(a)ii from 10 to 14 parts of surface treated titanium dioxide;
(b)ii from 8 to 16 parts of triethylene glycol;
(c)ii from 3 to 7 parts of 2-pyrrolidone;
(d)ii from 15 to 45 parts of glycerol;
(e)ii from 0.1 to 1.2 parts of an ethylene oxide condensate of 2,4,7,9 tetramethyl-5-decyne-4,7-diol;
(f)ii from 0.001 to 2 parts of 1,2-benzisothiazolin-3-one;
(g)ii from 0 to 20 parts of polymer particles; and
(h)ii the balance to 100 parts water.

The white ink of the present invention is of particular value for printing coloured, transparent and semi-transparent substrates. White printing on these surfaces is desirable in numerous end uses, such as the computer industry (printed circuit boards, computer chips), recording industry (tapes, film, etc.), packaging and automotive coatings. White ink is also be useful on other surfaces, such as plastics, wood, metal, glass, textiles, polymeric films and leather for both practical and ornamental purposes.

A second aspect of the invention provides an ink-jet printing process wherein the ink according to the first aspect of the invention is printed onto a substrate by means of an ink jet printer. Preferably the ink-jet printer has a print-head with multiple nozzles arranged at a high density to enabling single-pass printing.

A third aspect of the present invention provides a substrate printed by an ink-jet printing process as described in the second aspect of the invention using an ink as described in the first aspect of the invention. This substrate is as described and preferred in the first aspect of the invention.

According to a fourth aspect of the present invention there is provided an ink-jet printer ink container (e.g. a cartridge or a larger ink tank), comprising an ink as defined in the first aspect of the present invention The invention is further illustrated by the following Examples in which all parts and percentages are by weight unless otherwise stated.

EXAMPLES

Example 1

Composition of Example Ink 1

Example ink 1 was prepared by mixing all the components except the titanium dioxide dispersion. The pH was measured and adjusted to pH 8.0 to 8.3 with 5% ammonium hydroxide solution to give a pre-ink mixture. The titanium dioxide dispersion was diluted with a small amount of the pre-ink mixture and then was slowly added to the pigment dispersion. The pH was again measured and adjusted if it had fallen below 8.0. The resulting ink was filtered through a 1.0 micron syringe filter.

| Component | Example Ink 1 (weight %) |
| --- | --- |
| Titanium Dioxide | 8 |
| Diethylene Glycol | 12 |
| Surfynol 465 | 0.35 |
| Glycerol | 28.5 |
| 2-Pyrrolidone | 5 |
| Proxel GXL | 0.02 |
| Water | To 100 parts |

Properties of Example Ink

| Property | Example Ink 1 |
| --- | --- |
| pH | 8.5 |
| Surface Tension (dyne/cm) | 36.4 |
| Viscosity (mPa · s) | 5.8 |
| Density(g/cm$^3$) | 1.173 |
| Conductivity | 0.037 |
| Particle size (nm) | 251.3 |

The surface tension was measured at 25° C. using a Kruss K-11 Tensiometer (Wilhelmy Plate Method).

Viscosity was measured at 32° C. using a Brookfield DV-II or DV-II+ digital viscometer with UL-adapter and water jacket and spindle S00 at 3 rpm.

Density (specific gravity) of the ink was measured using a pycnometer.

Conductivity was measured using an Orion conductivity meter.

Particle size was measured using a Zetasizer from Malvern Instruments.

Ink Performance

Example ink 1 was printed through a Kyocera® KJ4B print-head mounted on a JetXpert imaging rig. The ink fired reliably through all the nozzles and caused only minimal face-plate wetting. These results indicate that the ink would be suitable for use in an industrial single pass ink-jet printer Example Inks 2 to 6

Example Inks 2 to 6 were prepared as described for Example Ink 1. The composition of these inks is as follows:

|                    | Ink 2 | Ink 3 | Ink 4 | Ink 5 | Ink 6 |
|--------------------|-------|-------|-------|-------|-------|
| Triethylene glycol | 12    | 12    | 12    | 12    | 12    |
| Surfynol 465       | 0.35  | 0.75  | 0.70  | 0.57  | 0.60  |
| Glycerol           | 28.5  | 19.0  | 19.0  | 22.0  | 19.5  |
| 2-Pyrrolidone (95%)| 5     | 5     | 5     | 5     | 5     |
| Proxel GXL         | 0.02  | 0.02  | 0.02  | 0.02  | 0.02  |
| Rovene 6102        |       | 4     |       |       |       |
| Rovene 6112        |       |       | 4     |       |       |
| NeoCryl A2890      |       |       |       | 4     |       |
| NeoRez R551        |       |       |       |       | 4     |
| TiO$_2$            | 12    | 12    | 12    | 12    | 12    |
| Water to 100 parts |       |       |       |       |       |

Surfynol ® 465 is an ethoxylated acetylenic surfactant from Air Products.
NeoRez ® R551 is a polyurethane dispersion from Neo Resins.
NeoRez ® R600 is a polyurethane dispersion from Neo Resins.
NeoCryl ® A2980 is an acrylic dispersion from Neo Resins.
Rovene ® 6102 is a styrene acrylic dispersion from Mallard Creek Polymers. The Tg of Rovene ® 6102 is 20° C.
Rovene ® 6112 is a styrene acrylic dispersion from Mallard Creek Polymers. The Tg of Rovene ® 6112 is 20° C.
Proxel ® GXL is a 20% solution of 1,2-benzisothiazolin-3-one in dipropylene glycol from Lonza.
The surface treated TiO$_2$ was from Kobo Products.

Properties of Example Inks 2 to 6

Example Inks 2 to 6 were prepared as described for Example Ink 1. The composition of these inks is as follows:

|                         | Ink 2 | Ink 3 | Ink 4 | Ink 5 | Ink 6 |
|-------------------------|-------|-------|-------|-------|-------|
| pH                      | 8.41  | 8.40  | 8.33  | 8.47  | 8.35  |
| Surface Tension (dyne/cm)| 34.40 | 35.19 | 35.09 | 35.64 | 35.64 |
| Viscosity (mPa · s)     | 6.38  | 5.99  | 5.97  | 5.91  | 6.23  |

The invention claimed is:

1. An ink comprising:
   (a) from 1 to 25 parts of surface treated titanium dioxide;
   (b) from 8 to 25 parts of a first solvent selected from the group consisting of ethylene glycol, diethylene glycol, triethylene glycol and dipropylene glycol;
   (c) from 2 to 12 parts of a second solvent selected from the group consisting of 2-pyrrolidone, N-methyl-2-pyrrolidone, N-ethyl-2-pyrrolidone, N-cyclohexyl-2-pyrrolidone and N,N-dimethylacetamide;
   (d) from 15 to 45 parts of glycerol;
   (e) from 0.1 to 2 parts of an acetylenic surfactant;
   (f) from 0.001 to 2 parts of 1,2-benzisothiazolin-3-one;
   (g) from 0 to 20 parts of polymer particles; and
   (h) the balance to 100 parts water.

2. The ink as claimed in claim 1 wherein the surface of the surface treated titanium dioxide in component (a) is treated with alumina, silica, silicone or mixtures thereof.

3. The ink as claimed in claim 1 wherein the treated titanium dioxide in component (a) is present in the range of from 8 to 16 parts.

4. The ink as claimed in claim 1 wherein the first solvent, component (b), is diethylene glycol.

5. The ink as claimed in claim 1 wherein the first solvent, component (b), is triethylene glycol.

6. The ink as claimed in claim 1 wherein component (c), the second solvent, is 2-pyrrolidone.

7. The ink as claimed in claim 1 wherein component (d), glycerol, is present in the range of from 15 to 40 parts.

8. The ink as claimed in claim 1 wherein the acetylenic diol surfactant used as component (e) is an ethylene oxide condensates of 2,4,7,9-tetramethyl-5-decyne-4,7-diol.

9. The ink as claimed in claim 1 wherein the ink comprises:
   (a)i from 10 to 14 parts of surface treated titanium dioxide;
   (b)i from 8 to 16 parts of diethylene glycol;
   (c)i from 3 to 7 parts of 2-pyrrolidone;
   (d)i from 20 to 40 parts of glycerol;
   (e)i from 0.1 to 1.2 parts of an ethylene oxide condensate of 2,4,7,9 tetramethyl-5-decyne-4,7-diol;
   (f)i from 0.001 to 0.1 parts of 1,2-benzisothiazolin-3-one;
   (g)i the balance to 100 parts water.

10. The ink as claimed in claim 1 wherein the ink comprises:
    (a)ii from 10 to 14 parts of surface treated titanium dioxide;
    (b)ii from 8 to 16 parts of triethylene glycol;
    (c)ii from 3 to 7 parts of 2-pyrrolidone;
    (d)ii from 15 to 45 parts of glycerol;
    (e)ii from 0.1 to 1.2 parts of an ethylene oxide condensate of 2,4,7,9 tetramethyl-5-decyne-4,7-diol;
    (f)ii from 0.001 to 2 parts of 1,2-benzisothiazolin-3-one;
    (g)ii from 0 to 20 parts of polymer particles; and
    (h)ii the balance to 100 parts water.

11. An ink-jet printing process wherein the ink according to claim 1 is printed onto a substrate by means of an ink jet printer.

12. A substrate printed by an ink-jet printing process according to claim 11 using an ink according to claim 1.

13. An ink-jet printer ink container comprising an ink according to claim 1.

* * * * *